(12) United States Patent
Monnier et al.

(10) Patent No.: US 11,876,912 B2
(45) Date of Patent: Jan. 16, 2024

(54) AEROSPACE ADVANCED CHAIN OF TRUST

(71) Applicant: THALES, Courbevoie (FR)

(72) Inventors: Stéphane Monnier, Merignac (FR); Alexandre Fine, Merignac (FR)

(73) Assignee: THALES, Courbevoie (FR)

( * ) Notice: Subject to any disclaimer, the term of this patent is extended or adjusted under 35 U.S.C. 154(b) by 336 days.

(21) Appl. No.: 17/463,144

(22) Filed: Aug. 31, 2021

(65) Prior Publication Data

US 2022/0078021 A1    Mar. 10, 2022

(30) Foreign Application Priority Data

Sep. 10, 2020    (FR) ..................... 2009145

(51) Int. Cl.
*H04L 9/32* (2006.01)

(52) U.S. Cl.
CPC .......... *H04L 9/3239* (2013.01); *H04L 9/3236* (2013.01)

(58) Field of Classification Search
CPC . H04L 9/3236; H04L 9/3239; H04L 2209/68; H04L 2209/84; H04L 9/3247
See application file for complete search history.

(56) References Cited

U.S. PATENT DOCUMENTS

| | | | | |
|---|---|---|---|---|
| 11,093,169 | B1* | 8/2021 | Shveidel | G06F 3/064 |
| 11,513,701 | B2* | 11/2022 | Shveidel | G06F 3/0604 |
| 2005/0198388 | A1* | 9/2005 | Teodosiu | G06F 9/4416 709/245 |
| 2007/0157146 | A1* | 7/2007 | Chen | G06F 30/392 716/132 |
| 2008/0256362 | A1* | 10/2008 | Takenaka | H04L 9/3247 713/180 |
| 2012/0131322 | A1* | 5/2012 | Smith | G06F 21/575 713/189 |
| 2013/0055025 | A1* | 2/2013 | Feix | G06F 21/554 714/E11.178 |

(Continued)

FOREIGN PATENT DOCUMENTS

| | | |
|---|---|---|
| EP | 0 686 906 A2 | 12/1995 |
| EP | 2 402 879 A1 | 1/2012 |

(Continued)

*Primary Examiner* — Gary S Gracia
(74) *Attorney, Agent, or Firm* — BakerHostetler (57) ABSTRACT

A method implemented by an onboard avionics computer for executing a plurality of binary codes that are associated with a plurality of sets of metadata, wherein: the plurality of binary codes and the plurality of metadata are hierarchized into a number of levels at least equal to two; a first binary code, of a level, is associated with a first set of metadata of the level, and a second binary code of a lower level, itself associated with a second set of metadata of the lower level; the first set of metadata comprises a data signature, the data comprising at least a first message digest associated with the first binary code, and the second set of metadata comprises a public key; the method comprising the execution, by the second binary code, of the following steps: applying a hash function to obtain a second message digest of the first binary code; decrypting the signature using the public key to obtain the first message digest; authorizing the execution of the binary code, if and only if the first message digest is identical to the second.

9 Claims, 3 Drawing Sheets

(56) References Cited

U.S. PATENT DOCUMENTS

| | | | | |
|---|---|---|---|---|
| 2014/0380031 A1* | 12/2014 | Jones | .................... | G06F 21/572 |
| | | | | 713/2 |
| 2015/0100794 A1* | 4/2015 | Joye | .................. | H04L 9/30 |
| | | | | 713/189 |
| 2016/0350529 A1* | 12/2016 | Kerr | ..................... | G06F 21/51 |
| 2017/0235961 A1* | 8/2017 | August | ................ | G06F 21/577 |
| | | | | 713/189 |
| 2017/0255775 A1* | 9/2017 | Sorresso | ............... | G06F 21/575 |
| 2019/0042750 A1* | 2/2019 | August | ................ | H04L 9/3242 |
| 2020/0026857 A1* | 1/2020 | Muller | ................... | G06F 21/12 |
| 2020/0243205 A1* | 7/2020 | Sharma | ................ | G06F 16/137 |
| 2020/0342111 A1* | 10/2020 | Gomes | ................. | G06F 21/575 |
| 2020/0409921 A1* | 12/2020 | Starks | ...................... | G06F 9/54 |
| 2021/0377042 A1* | 12/2021 | Valdez | ............... | G06Q 30/0185 |
| 2022/0078021 A1* | 3/2022 | Monnier | ............... | H04L 9/3236 |

FOREIGN PATENT DOCUMENTS

| | | |
|---|---|---|
| EP | 2 962 241 A1 | 1/2016 |
| WO | 2014/134389 A1 | 9/2014 |

* cited by examiner

AEROSPACE ADVANCED CHAIN OF TRUST

CROSS-REFERENCE TO RELATED APPLICATIONS

This application claims priority to foreign French patent application No. FR 2009145, filed on Sep. 10, 2020, the disclosure of which is incorporated by reference in its entirety.

FIELD OF THE INVENTION

The field of the invention is that of cyber security. The document describes systems and methods for guaranteeing the authenticity and the integrity of software executed on an onboard aerospace platform.

BACKGROUND

The execution of software with integrity and authenticity is difficult to guarantee in general, and is particularly so in the aerospace field in which safety is critical.

Among numerous technical problems, it is necessary to define an architecture (hardware and/or software) that makes it possible to guarantee, or at the very least to make robust, the trustworthy (corruption-free) and authentic (signed by a secret holder) execution of software.

This problem is conventionally dealt with using PKI (public key infrastructure) mechanisms, in particular with the verification of multiple signatures. In terms of hardware, these mechanisms are potentially coupled to a TPM (trusted platform module), for example responsible for burying an inalterable reference in the hardware. In one alternative, a recursive "chain of trust" may be put in place, in which an initial element verifies the authenticity and integrity of a higher-level element, which in turn verifies an element a level above. For example, the boot sequence (BOOT) may verify the operating system (OS) (e.g. partitions, checksums, etc.), which in turn progressively verifies the launching of software applications, etc.

The scientific literature describes many techniques regarding chains of trust. The patent literature comprises, in particular, document EP2402879, which describes a method for installing embedded software. This method includes generating one or more firmware file instances and generating one or more digital certificate instances that are separate instances from the firmware file instances. The method includes associating the one or more digital certificate instances with one or more firmware file instances to facilitate updating. This approach has limitations.

There is a need for advanced methods and systems for managing chains of trust in avionics.

SUMMARY OF THE INVENTION

To that end, one subject of the invention is a method implemented by an onboard avionics computer for executing a plurality of binary codes that are associated with a plurality of sets of metadata, wherein: the plurality of binary codes and the plurality of metadata are hierarchized into a number of levels at least equal to three; each first binary code, of a level, is associated with a first set of metadata of said level, and a second binary code of an immediately lower level, itself associated with a second set of metadata of said immediately lower level; the first set of metadata comprises data comprising at least a first message digest associated with the first binary code, and a data signature; the second set of metadata comprises a public key associated with the data signature; said method comprising the execution, by the second binary code, of the following steps: verifying the validity of the data signature using the public key; if the data signature is valid: applying a hash function to obtain a second message digest of the first binary code; authorizing the execution of the first binary code, if and only if the first message digest is identical to the second.

Advantageously, the data comprise a plurality of message digests that are associated with a plurality of binary codes of said level; if the first set of metadata is associated with a set of metadata of an immediately higher level, the data comprise at least one public key that is associated with at least one signature of said set of metadata of the immediately higher level.

Advantageously, the method further comprises, if the execution of the first binary code is not authorized, a step of sending an error to a third-party system.

Advantageously, the public key is associated with an instance number; said method comprises, in the case of revocation of the public key: incrementing the instance number associated with the public key; replacing the data signature with a new signature, obtained by encrypting the data with a new private key associated with a new public key of the second set of metadata; and wherein the execution of the first binary code is authorized only if the instance number associated with the public key is greater than or equal to the instance number associated with the last public key that allowed its execution.

Advantageously, the initialization of the loading and of the execution of a first-level binary code is authorized by a public key engraved into the hardware of the onboard avionics computer.

Advantageously, each set of metadata is associated with a plurality of binary codes of the same level forming an application.

Advantageously, the plurality of sets of metadata and the plurality of binary codes form a rooted tree, each node of the tree being formed of a set of metadata and of at least one binary code associated with said set, and wherein the execution of the binary codes of a node other than the root node is authorized by a binary code of the parent node of said node.

Another subject of the invention is a computer program product, said computer program product comprising code instructions for performing the steps of the method according to one of the embodiments of the invention, when said computer program product is executed on a computer.

Another subject of the invention is a system comprising an avionics computer configured to implement steps of the method according to one of the embodiments of the invention.

BRIEF DESCRIPTION OF THE DRAWINGS

Other features, details and advantages of the invention will become apparent from reading the description, which is given with reference to the appended drawings, which are given by way of example and which show, respectively.

DETAILED DESCRIPTION

Certain acronyms commonly used in the technical field of the present application might be employed in the course of the description. These acronyms are listed in the table hereinbelow, with notably the corresponding term and meaning and the definition of the main terms of the technical field of the invention.

TABLE 1

| Acronym | Term | Meaning |
| --- | --- | --- |
| ACD | Aircraft Control Domain | Groups together those systems whose primary function is to control the aircraft. |
| AISD | Aircraft Information Service Domain | Groups together those systems which are intended to provide services and connectivity to independent aircraft systems. |
| ARINC | Aeronautical Radio, Incorporated | Company held by major American aerospace players known for defining the main communication standards inside aircraft and between aircraft and the ground. Refers both to the company and to the standards produced, for example the ARINC 429 and ARINC 661 standards. |
| ATC | Air Traffic Control | Service provided by air traffic controllers on the ground to guide an aircraft to the ground safely. |
| EFB | Electronic Flight Bag | Electronic information management device allowing aircraft crew to perform flight management tasks more easily and efficiently, with less paper. |
| FCC | Flight Control Command | |
| FMS | Flight Management System | Computerized system for calculating aircraft trajectories and flight plans, and for supplying suitable guide instructions for the pilot or autopilot to follow the trajectory calculated. |

Figure 1:
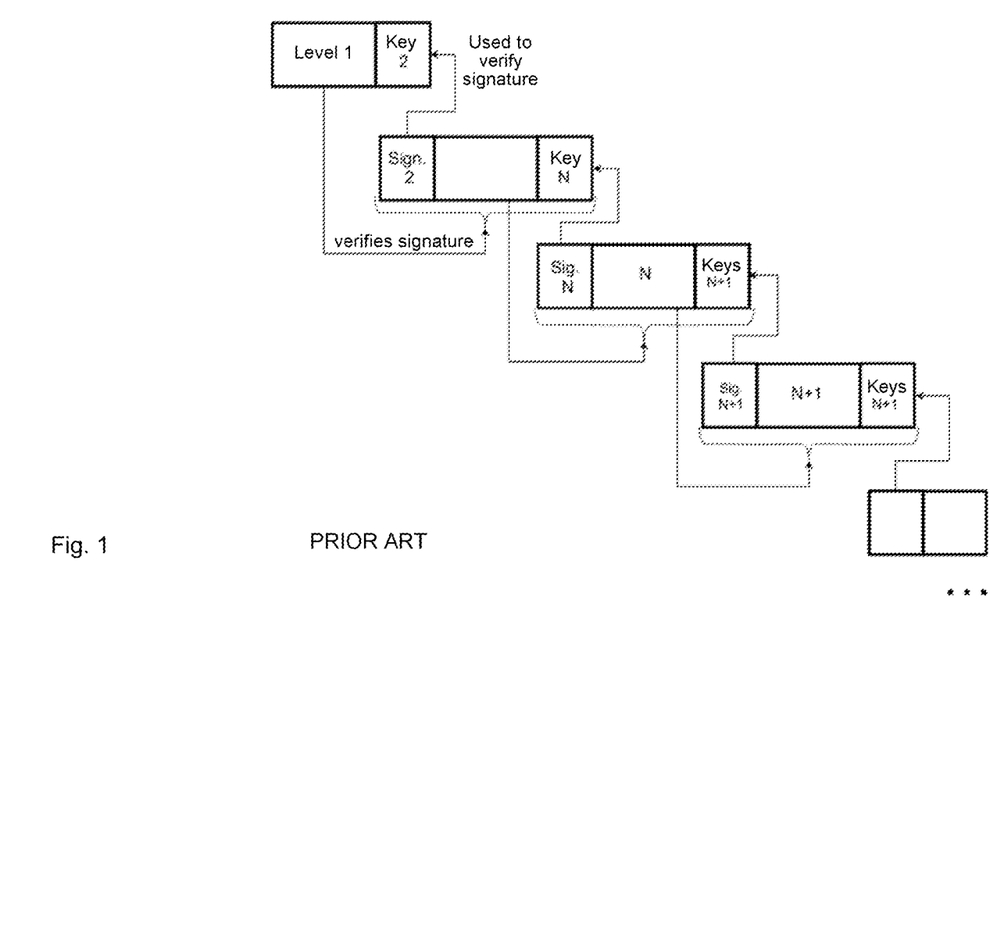
FIG. 1 an example of a chain of trust, known from the prior art.

FIG. 1 illustrates an example of a chain of trust, known from the prior art.

In this example, verification is performed by transitivity: each level verifies the level above it.

According to this approach, level k verifies the signature of level k+1 while also verifying that the key used to sign level k+1 is recognized as legitimate. To verify this legitimacy, it is necessary to incorporate the public key used by level N+1 into level N.

Verification is, for example, achieved by verifying the signature of a binary. This signature is commonly determined by encrypting the message digest of the binary (hash value or hash) using a private key. Typically, the message digest may be the product of the SHA256 algorithm, the encryption being performed using the RSA 4096 algorithm. To verify a signature, the message digest of the binary of this signature must be compared with the decryption of the signature using the public key.

This approach of the prior art is not optimal for a number of reasons.

In the case of revocation of a key, the revoked key must be removed from the list of legitimate keys. To do this, it will also be necessary to modify the level N software responsible for verifying the signature of the level N+1 software. Revoking a key used to sign level N+1 software necessitates modifying the level N and N+1 software: a) the level N software to remove the key and replace it with a new key, and b) the level N+1 software to sign the software using this new key. The situation is not satisfactory in avionics.

Figure 2:
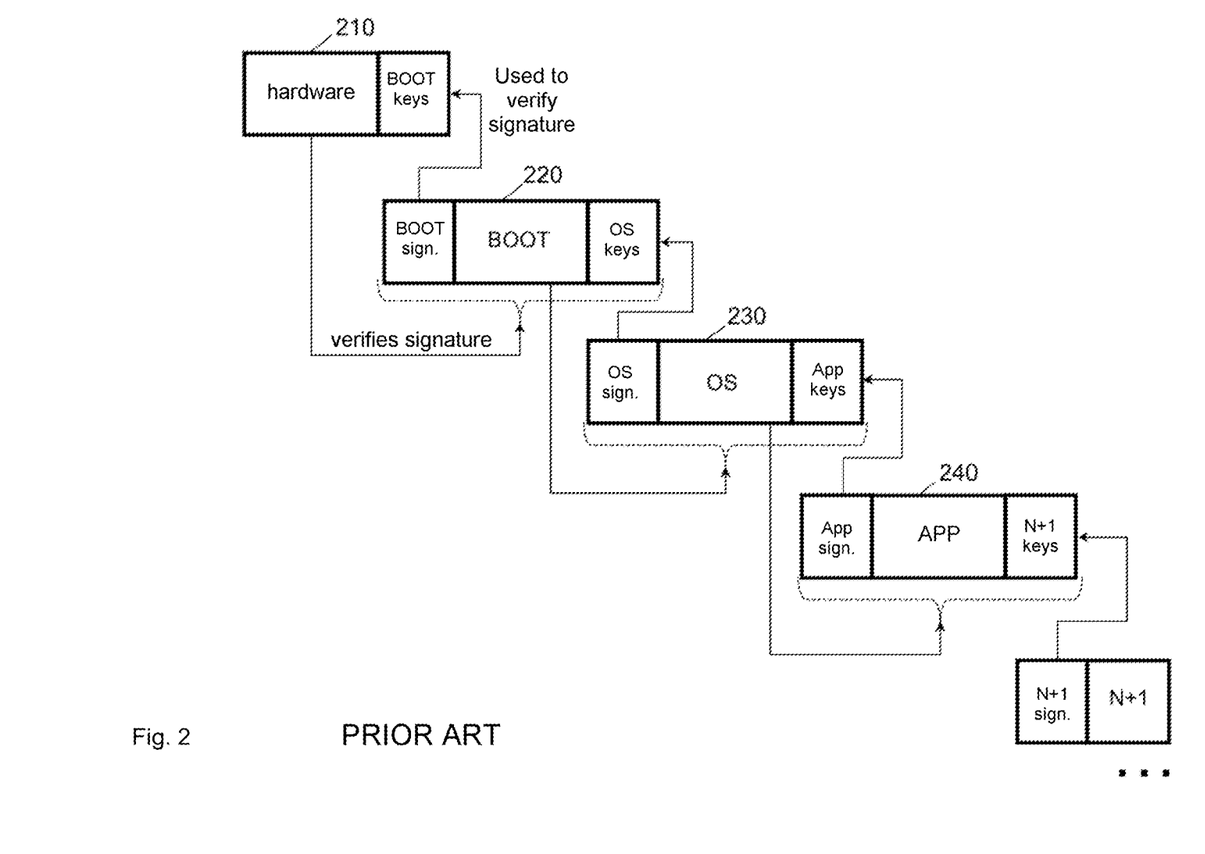
FIG. 2 another example known from the prior art, specific to the aerospace field.

FIG. 2 illustrates another example known from the prior art, specific to the aerospace field.

An exemplary sequence is described below. A key buried in or engraved into the hardware 210 (which is inalterable) allows the boot sequence BOOT 220 to be loaded and launched, which in turn verifies and launches a first portion of the operating system OS 230, which in particular launches system services, and then another portion (not shown) which loads resources intended for the software applications 240 which will be loaded downstream.

Definitions of terms are provided hereinafter.

Throughout the remainder of the document, an "aircraft" may be a commercial aeroplane, a cargo plane, or a helicopter, which might or might not have passengers on board. These terms refer to any element capable of being piloted remotely (a drone, via radio or satellite link, or the like), at least partially (intermittently, or periodically, or even opportunistically over time).

An aircraft comprises one or more "avionics computers" (a specific type of computer).

An "avionics computer" is a system having specific technical features in comparison with a "non-avionic" system (or "open-world" system), these technical features being certified administratively by a trusted authority (in this case the aviation regulator). The regulations lead to specific technical features. With regard to the distinctive technical features of an avionic system, a system—generally, that is to say avionic or non-avionic—may have or be associated with a predefined failure rate (from a predefined failure rate range), a failure rate comprising or determining a predefined execution error rate. In one embodiment, the failure rate of an avionic system is lower than the failure rate of a non-avionic system. In one embodiment, the failure rate of an avionic system is significantly or substantially lower than that of a non-avionic system.

An avionic system or avionics computer denotes a reliable system (or a system with guaranteed reliability). It is a system the failure of which has consequences that exceed accepted or acceptable and therefore critical limits. A failure may be characterized by the loss of the function under consideration, or by the production of erroneous data, with or without detection of an error. Depending on the level of criticality of the critical consequences, the probability of occurrence must be kept below a threshold of acceptability. Thus, the more critical the consequence, the lower the acceptable probability of occurrence. For example, in aeronautics, a catastrophic event (multiple deaths) will have to have a probability of occurrence of less than $10^{-9}$ per flight hour, while a major incident (reduction of the safety margins and of the operational capabilities, discomfort or minor injuries) will have to have a probability of occurrence of less than $10^{-5}$ per flight hour. To meet these objectives, the architecture of the (reliable) avionic system according to the invention and also the design of each component guarantee this probability of occurrence through guarantees of fault rate for each device (physical and/or logic faults) and verification levels (functional and structural test coverage) of the software.

A "binary code" (or hereinafter an item of "software") is a code (e.g. compiled instruction sequences) that can be executed on one or more computers, or data referred to as "database" data. The binary codes to which reference is made in this document are special binary codes, in that they are certified by the aviation regulator (administrative as well as technical character in that technical properties are associated with these codes, e.g. determinism, reliability, symbolic verification, etc.). A binary code may form all or part of an item of firmware, of an operating system, of an application, of a system or other process, etc.

The integrity of a binary code refers to the fact that this code has not been altered, attacked, corrupted or otherwise modified (with the exception of hash collisions, which are considered here to be unlikely or non-existent).

Figure 3:
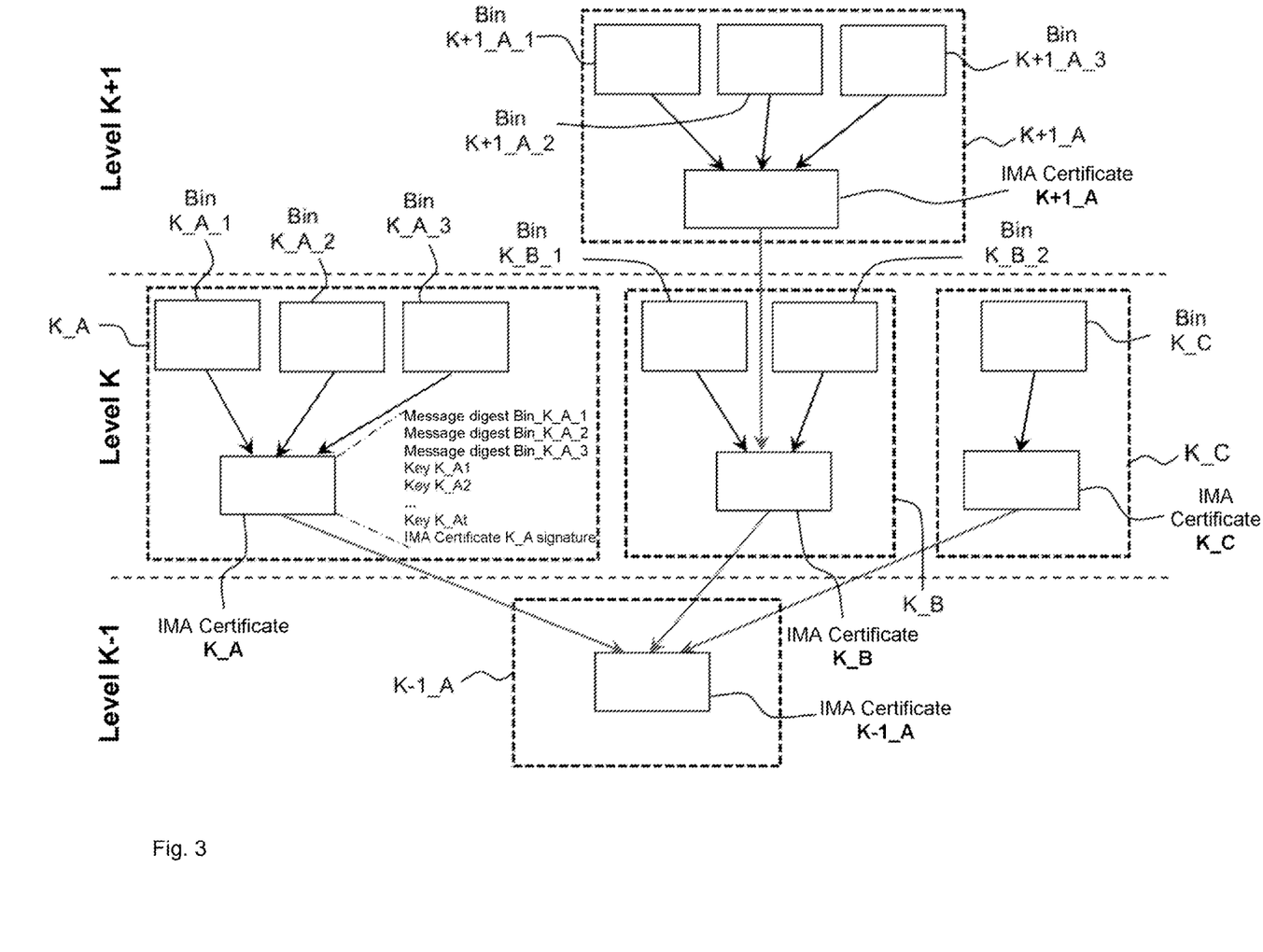
FIG. 3 an exemplary embodiment of the method according to the invention.

FIG. 3 illustrates an exemplary embodiment of the method according to the invention.

The method according to the invention verifies the authenticity and the integrity of one or more binary codes. The two concepts of authenticity and integrity are independent: specifically, it is possible to have a code with authenticity but not integrity, and conversely, it is possible to have a code without authenticity but with integrity. The two last situations do not correspond to situations addressed by the invention.

The invention is based on a number of principles.

First, the binary codes are hierarchized into successive levels. They may thus be ordered from a lowest level or level 1 to a highest level or level N. There are at least two levels, and the execution of a level k binary code must be authorized by a binary code of a lower level k'. Thus, a chain of trust is created, consisting in sequentially authorizing the execution of the codes, from the lowest to the highest level.

The binary codes are associated with sets of metadata. The sets of metadata are also called IMA (integrated modular avionics) certificates. Throughout the remainder of the description, the term "set of metadata" and IMA certificate may be used interchangeably.

The sets of metadata are also hierarchized into levels, and each set of metadata is associated with one or more binary codes. In general, each binary code is associated with a single set of metadata, and each set of metadata is associated with one or more binary codes.

In one set of embodiments of the invention, each set of metadata is associated with a plurality of binary codes of the same level forming an application (for example, a plurality of executable binary codes, and a database forming an application). This makes it possible to connect the entirety of the application to the same execution conditions.

The execution of a binary code of a level k must be authorized by a binary code of a lower level k'. In order to describe this mechanism in greater detail, it will be described by means of a first binary code of level k, and a second binary code of lower level k'. The execution of the first binary code (of level k) must be authorized by the second binary code (of level k').

The first binary code (of level k) is associated with a first set of metadata, also of level k. The second binary code (of level k') is associated with a second set of metadata, also of the lower level k'.

The lower level k' may be an immediately lower level k−1. However, more generally, it may be any lower level k−1, k−2, k−3, etc. Thus, the authorization of the execution of a binary code may be provided to the level k by the immediately lower level k−1, or another lower level of higher rank k−2, k−3, etc.

Throughout the remainder of the description, the mechanism will mainly be described through the provision of authorization to execute a level k code by a level k−1 code. However, the invention is not limited to these examples and, as mentioned above, the authorization for execution may also be provided by a level k−2, k−3, etc. code.

In order to allow the execution of the binary codes, each set of metadata comprises data, themselves comprising at least one message digest of a binary code, and potentially comprising at least one public key. A set of metadata also comprises a signature for these data.

More particularly, the first set of metadata comprises data comprising at least a first message digest associated with the first binary code, and a signature for said data of the first set of metadata, or IMA certificate, of level k; and the second set of metadata, of lower level k', comprises a public key associated with the data signature for the first set of metadata, or IMA certificate, of level k. If the first binary code exhibits integrity, the first message digest corresponds to the product of the application of a hash function to the first binary code. If, in addition, the metadata exhibit authenticity and integrity, the data signature corresponds to the encryption of a message digest of the data using a private key associated with the public key. In this case, the validity of the data signature may be successfully verified using the public key of the second set of metadata.

In order to authorize or otherwise the execution of the first binary code, the second binary code performs the following steps.

First, it verifies the validity of the data signature using the public key. In practice, this verification consists in decrypting the signature using the public key contained in the second set of metadata, or IMA certificate, of lower level k', computing a message digest of the data contained in the first set of metadata by applying a hash function to these data, and then comparing this message digest with the decryption of the signature. If the two data obtained are identical, the signature does indeed correspond to the same data, encrypted using the private key associated with the public key. The first set of metadata may then be considered to exhibit authenticity and integrity.

Next, if the signature of the first set of metadata is valid, the message digest of the first binary code contained in the first set of metadata is considered to exhibit authenticity and integrity, and the second binary code verifies the integrity of the first binary code.

First, it applies a hash function to obtain a second message digest of the first binary code. It is of course necessary for the same hash function to be used in this step as that which was used previously to generate the first message digest. This function may therefore be a predefined function.

For example, the SHA256 function may be used. Specifically, this function has the advantage both of offering a high level of protection and of being executable by a cryptographic accelerator, thus allowing a short execution time. This function may thus be provided natively by the avionics computer and used by the binary codes.

Lastly, the second binary code verifies the identity of the first message digest, contained in the first set of metadata, and of the second message digest, obtained by hashing the first binary code. The execution of the first binary code is authorized only if the two message digests are identical.

Specifically, the two message digests being identical means that the message digest originating from the application of the hash function to the first binary code is indeed the same as that which was used to generate the signature. The first binary code therefore does indeed exhibit integrity.

The features of the invention therefore allow the execution of the binary codes if and only if they exhibit authenticity and integrity.

In addition, in the case of a key or a certificate being revoked, all that has to be done is to regenerate the metadata using a new pair of private keys/public keys, i.e. all that has to be done is to replace the signature in the first set of metadata with a new signature obtained using a new private key, and to replace the public key in the second set of metadata with the public key associated with the new private key.

Unlike the solutions of the prior art, it is therefore not necessary to regenerate the binary codes themselves. The invention therefore allows greater flexibility in the authorization of the execution of the binary codes.

Although the mechanism for authorizing the execution of a binary code has been described here using the association of two codes of two successive levels, this mechanism may be generalized for multiple levels, metadata, and codes.

Thus, the pluralities of codes and sets of metadata may be represented by a rooted tree, in which each node of the tree is formed of a set of metadata and of at least one binary code associated with said set, and the execution of the binary codes of a node other than the root node is authorized by a binary code of the parent node of said node. In this representation, the level of a metadatum or of a binary code is defined by the depth of the node to which they belong. Typically, a node of the tree may represent an application, with all of the binary codes for the application, and the associated set of metadata allowing the application to be executed.

Thus, the execution of a code is authorized, iteratively, by all of the parent nodes, which makes it possible to recursively establish the authenticity and integrity of all of the codes participating in the execution. Thus, a complete chain of trust is obtained.

Of course, this is not applicable to the execution of a binary code of first level, and therefore located at the root of the tree.

In one set of embodiments of the invention, these first-level codes may however also be associated with a set of metadata comprising a signature, and the authorization of execution is identical to that described above except that their execution is authorized by a public key engraved into the hardware of the avionics computer, i.e. the signature for the set of metadata of the root node has to be encrypted using a private key associated with the public key engraved into the hardware of the avionics computer, and the message digest of a first-level binary code obtained by decoding this key must be identical to a message digest obtained by hashing the code, for the code to be able to be executed.

This makes it possible to ensure that a binary code of first level/at the root of the rooted tree does indeed exhibit authenticity and integrity in order to authorize its execution. This makes it possible to ensure that the chain of trust is respected, from the lowest execution level, since the public key engraved into the avionics computer is unforgeable.

The invention makes it possible to improve the execution time of the execution authorization method. Specifically, for an equal amount of data to be processed, hash functions are nowadays much faster to execute than encryption/decryption functions. In this case, to authorize or otherwise the execution of the first binary code, encryption/decryption is performed only on a message digest of the metadata, comprising in particular one or more message digests. Thus, time-intensive computing operations are applied only once, thereby allowing a short execution time. In addition, just one message digest signature verification is required to verify the authenticity of one or more message digests. The number of times cryptography functions (which are costly in terms of computing time) are used is therefore decreased. This is particularly relevant in the present case, since it makes it possible to verify the authorization of the execution of a binary in less time, and therefore not to delay the loading and execution of the binary code.

In one set of embodiments of the invention, the signed data of the first set of metadata comprise: a plurality of message digests associated with a set of binary codes of said level k; for example, the set of binary codes may correspond to the binary codes of one and the same application; for example, in the case that a tree structure is adopted, the set of metadata may comprise one message digest per binary code located at one and the same node of the tree.

In the case that the first set of metadata is also associated with a set of metadata of immediately higher level:
the signed data of the first set of metadata comprise at least one public key associated with at least one signature of the set of metadata of a higher level k''. For example, if a tree structure is adopted, the first set of metadata may comprise a public key for the set of metadata of each child node;
the signature comprised in the first set of metadata is therefore a data signature comprising, in addition to one or more binary code message digests, at least one public key associated with at least one signature of a set of metadata of the higher level k'', thus, verification of the signature makes it possible, in a single operation, to validate the authenticity of all of the message digests and public keys comprised in the first set of metadata. In other words, when a tree structure is adopted, it makes it possible to verify, in a single operation, the authenticity of the message digests associated with all of the binary codes of the current node, and of the public keys allowing the authenticity of the sets of metadata of each of the child nodes to be verified.

The higher level k'' may be an immediately higher level k+1, or a higher level of higher rank k+2, k+3, etc.

In one set of embodiments of the invention, the sets of metadata are stored in memory regions of the avionics computer. These metadata are stored independently of the binary codes. This independence allows, in particular, the activation (or the non-activation or deactivation) of one or more of the embedded binary codes.

The invention thus makes it possible to securely revoke the keys that have allowed an application to be signed without having to modify the lower-level applications. The management of authorization of the execution of various software codes is thus made more dynamic.

In one set of embodiments of the invention, the method further comprises the step of communicating, if the execution of the first binary code is not authorized, the error to a third-party system.

This step is detectable. A system analysis may identify the error and its cause (e.g. reused or compromised public key), a posteriori. In one ("interactive") embodiment, the error and/or information relating to the error may be displayed. In other words, the method may establish a security log and issue an alert according to said security log.

In one set of embodiments of the invention, a public key is associated with a validity time period, said period being associated with one or more dates. A public key may expire after a certain predefined date 1. A public key may not be usable before a certain predefined date 2. A public key may be usable only after a certain date 3 and before a date 4.

In one set of embodiments of the invention, the sets of metadata are also subject to a metadata validity date. Since it is not able to prevent the starting up of an aircraft in the event of an expired set of metadata, the date is not used to authorize or otherwise the launching of the execution of an item of software. However, operationally, when the date is available, the date of a set of metadata may be verified; if it is not valid, an alert may be issued. In general, various timing schemes may be used: e.g. predefined time periods, comprising absolute instants in time and/or durations.

In one set of embodiments, the method further comprises an "anti-rollback" mechanism for managing the public keys. This mechanism consists in preventing, after the revocation of a public key, authorization to execute a binary code using an old set of metadata.

To do this, the public key is associated with an instance number. In the event of revocation of the public key associated with the signature of the first set of metadata, a number of operations are performed:

the instance number associated with the public key is incremented;

the data signature of the first set of metadata is replaced with a new signature, obtained by encrypting the data with a new private key associated with a new public key of the second set of metadata.

Thus, the new signature is completely compatible with the new public key, and the execution of the first binary code may be authorized or otherwise, transparently. In addition, in the context of the public key anti-rollback mechanism, the execution of the first binary code is authorized only if the instance number of the public key allowing the decryption of the signature of a set of metadata associated therewith is greater than or equal to the instance number of the last public key that allowed the decryption of the set of metadata, i.e., once a set of metadata associated with a public key with an incremented instance number is loaded, it is no longer possible to authorize the execution of this binary code using an old set of metadata. This makes it possible to prevent an attack based on loading an old IMA certificate or an old application whose key has been corrupted.

The new public key may be obtained in various ways. In one set of embodiments of the invention, a new pair of keys comprising the new public key and the new private key is generated, and then the new public key replaces the initial public key in the second set of metadata.

It is also possible to have a plurality of pairs of private and public keys in advance, all of the public keys being comprised in the second set of metadata, each associated with an instance number. When the instance number is incremented, the public key corresponding to the new instance number is selected, and the corresponding private key is used to generate the new signature. This last embodiment has the advantage that, when a public key is revoked, only the first set of metadata corresponding thereto has to be re-signed, the new public key already being present in the second set of metadata, which is itself signed. Thus, the chain of trust comprises the signature for all of the public keys used but, in the event of revocation of a public key, only one set of metadata has to be re-signed.

The anti-rollback mechanism for managing the public keys may be implemented in various ways. For example, the downloading of a set of metadata associated with a public key that has an instance number smaller than the instance number of the current public key may be prevented. Alternatively, the highest instance number associated with a given public key may be stored, and the decryption of a corresponding set of metadata via a public key that has a smaller instance number is prevented.

In this way, when a key is revoked, once the new set of metadata is loaded with a public key that has an incremented instance number, it becomes impossible to load an old IMA certificate or an old application. This verification of authorization is done at the moment of downloading or of execution. This anti-rollback mechanism makes it possible to prevent an attack being replayed: if a public key of level k is compromised, then an attacker could falsify a level k+1 and launch the execution of malicious code.

Thus, it will no longer be possible to load or execute an old item of software exhibiting vulnerabilities. Additionally, it is thus not possible for an attacker to reload old metadata using a stolen key.

What is described is a computer program product, said computer program comprising code instructions for performing one or more of the steps of the method when said program is executed on a computer.

A system is described comprising a deterministic avionics computer for implementing one or more steps of the method.

FIG. 3 shows an example of metadata and binary codes in one set of embodiments of the invention.

The following are shown in this example:
5 sets of metadata IMA Certificate K−1_A, IMA Certificate K_A, IMA Certificate K_B, IMA Certificate K_C, IMA Certificate K+1_A;
9 binary codes Bin K_A_1, Bin K_A_2, Bin K_A_3, Bin K_B_1, Bin K_B_2, Bin K_C_1, Bin K+1_A_1, Bin K+1_A_2, Bin K+1_A3.

The binary codes and sets of metadata are organized into successive levels, with here:
a lower level k−1, comprising IMA Certificate K−1_A;
an intermediate level k;
a higher level k+1

Lastly, the metadata and binary codes are organized in nodes of the tree, with here:
a node K−1_A, of level k−1, comprising the set of metadata IMA Certificate K−1_A, and at least one binary code which is not shown;
a node K_A, of level k, child of the node K−1_A, comprising the set of metadata IMA Certificate K_A, and the binary codes Bin K_A_1, Bin K_A_2 and Bin
a node K_B, of level k, child of the node K−1_A, comprising the set of metadata IMA Certificate K_B, and the binary codes Bin K_B_1 and Bin K_B_2;
a node K_C, of level k, child of the node K−1_A, comprising the set of metadata IMA Certificate K_C, and the binary codes Bin K_C_1;
a node K+1_A, of level k+1, child of the node K_B, comprising the set of metadata IMA Certificate K+1_A, and the binary codes Bin K+1_A_1, Bin K+1_A_2 and Bin K+1_A_3.

Typically, the binaries of one and the same node may correspond to all of an application.

To clarify FIG. 3, only some of the binaries and metadata of the example are shown. For example, the node K−1_A comprising the IMA Certificate K−1_A also comprises at least one binary code, and the node K_A comprises multiple children.

In this example, each set of metadata may comprise one or more elements from among:
one or more message digests obtained by applying a hash function to the binaries of the same node as the set of metadata;
one or more public keys allowing the decryption of a signature of the sets of metadata of the child nodes;
a signature of the one or more message digests and public keys of the set of metadata.

By way of example, in FIG. 3, the set of metadata IMA Certificate K_A comprises:
3 message digests Message digest Bin_K_A_1, Message digest Bin_K_A_2, Message digest Bin_K_A_3 corresponding, respectively, to the product of the application of a hash function to the binary codes Bin K_A_1, Bin K_A_2, Bin K_A_3;
t public keys Key K_A1, K_A2, . . . K_At corresponding, respectively, to sets of metadata of t child nodes of the node K_A;
a signature IMA Certificate_K_A signature, corresponding to a signature of the set of data formed by the 3 message digests and the t public keys, with a private key, the corresponding public key of which is contained in the certificate IMA Certificate_K−1_A.

Thus, the authenticity of each set of metadata is verified by verifying its signature, by virtue of a public key contained in the metadata of the parent node, and the entirety of the binaries is verified via the message digests comprised in the sets of metadata of the same node.

This makes it possible to define a complete chain of trust, starting from one of the meta data of a root node (here IMA Certificate K−1_A), to each binary of each node.

Avionics Computer

In general, there is no systemic risk in avionics computers. First, applications are partitioned or confined, i.e. do not share common resources which might be erroneous (or attacked). Second, at an even higher level, beyond the scope of this document, computers are duplicated or triplicated, with numerous integrated safety mechanisms (failsafes).

However, it is worth noting the determinism property of the operating system (for example, the "PikeOS" operating system). In personal computers (open world), instruction branch predictions may lead to non-constant or even erratic behaviours. In the aerospace field, the same data handled by the same algorithms give the same results (reproducibility). In other words, avionics computers are a very special type of computer, defined, in particular, by the ARINC 653 standard.

The architecture of avionic systems aims to detect erroneous data and the propagation of faults.

In one embodiment, instead of a complete operating system, the avionics computer may be reduced to a sequencer. A sequencer is installed in the cockpit of an aircraft. At a low level, it sequentially processes flight commands, to process flight command laws, in a predefined manner. For example, for 50 milliseconds, only flight commands are handled, and the next 50 ms are used for other instructions.

In general, the perimeter of the invention (i.e. the computers addressed by the method according to the invention and variants thereof) is that of the ACD.

The ACD perimeter comprises certified FMS computers and/or data, automatic pilot or AP data, FCC or flight-control commands, IRS/GNSS/ADC positioning-system data, data from ACAS-TCAS, TAWS-GPWS and radar surveillance systems, data from AOF or taxiing systems, data from RMS/RMP radio-communication systems, wireless company communication data, AOC or ATC air-traffic data, management data from maintenance systems, warning systems, engine data, data from air-conditioning systems, landing-gear management data, data relating to actuators, data relating to electrical and/or hydraulic distribution in the aircraft.

Conversely, the invention does not concern the AISD domain. The perimeter concerns electronic flight bags (EFBs), cabin systems (IFE), data from systems on the ground, etc.

If the cascade of signatures is verified correctly, then the overall system exhibits (or is launched and executed with) authenticity and integrity.

The invention may be implemented on the basis of hardware and/or software elements. It may be available as a computer program product on a computer-readable medium. The computer may be an avionics flight computer. The medium may be electronic, magnetic, optical or electromagnetic. In terms of hardware, the embodiments of the invention may be numerous. For example, distributed architecture of "cloud computing" type may be used. Peer-to-peer servers, completely or partially distributed (existence of centres) may interact. The invention is not limited to aircraft and may be implemented in safety-critical systems.

The examples above demonstrate the capability of the invention to provide a chain of trust allowing the secure execution of code in the field of flight computers. These examples are however given only by way of example and in no way limit the scope of the invention, which is defined in the claims below.

The invention claimed is:

1. A method implemented by an onboard avionics computer for executing a plurality of binary codes that are associated with a plurality of sets of metadata, wherein: the plurality of binary codes and the plurality of metadata are hierarchized into a number (M) of levels at least equal to three;
   each first binary code, of a level (k), is associated with a first set of metadata of said level (k), and a second binary code of an immediately lower level (k'), itself associated with a second set of metadata of said immediately lower level (k');
   the first set of metadata comprises data comprising at least a first message digest associated with the first binary code, and a data signature; the second set of metadata comprises a public key associated with the data signature;
   said method comprising the execution, by the second binary code, of the following steps: verifying the validity of the data signature using the public key;
   when the data signature is valid: applying a hash function to obtain a second message digest of the first binary code;
   authorizing the execution of the first binary code, if and only if the first message digest is identical to the second.

2. The method according to claim 1, wherein:
   the data comprise a plurality of message digests that are associated with a plurality of binary codes of said level (k);
   if the first set of metadata is associated with a set of metadata of an immediately higher level (k"), the data comprise at least one public key that is associated with at least one signature of said set of metadata of the immediately higher level (k").

3. The method according to claim 1, further comprising, if the execution of the first binary code is not authorized, a step of sending an error to a third-party system.

4. The method according to claim 1, wherein:
   the public key is associated with an instance number;
   said method comprises, in the case of revocation of the public key:
   incrementing the instance number associated with the public key;
   replacing the data signature with a new signature, obtained by encrypting the data with a new private key associated with a new public key of the second set of metadata;
   and wherein the execution of the first binary code is authorized only if the instance number associated with the public key is greater than or equal to the instance number associated with the last public key that allowed its execution.

5. The method according to claim 1, wherein the initialization of the loading and of the execution of a first-level binary code is authorized by a public key engraved into the hardware of the onboard avionics computer.

6. The method according to claim 1, wherein each set of metadata is associated with a plurality of binary codes of the same level forming an application.

7. The method according to claim 1, wherein the plurality of sets of metadata and the plurality of binary codes form a rooted tree, each node of the tree being formed of a set of metadata and of at least one binary code associated with said set, and wherein the execution of the binary codes of a node other than the root node is authorized by a binary code of the parent node of said node.

8. A non-transitory storage medium comprising a computer program, said computer program comprising code instructions for performing the steps of the method according to claim 1, when said computer program is executed on a computer.

9. A system comprising an avionics computer configured to implement steps of the method according to claim 1.

* * * * *